(12) United States Patent
DeCato et al.

(10) Patent No.: US 10,889,737 B2
(45) Date of Patent: Jan. 12, 2021

(54) DUAL CURING OPTICALLY TRANSPARENT ADHESIVE COMPOSITIONS

(71) Applicant: HENKEL IP & HOLDING GMBH, Duesseldorf (DE)

(72) Inventors: Alfred A. DeCato, Highland, MI (US); Shuhua Jin, Cheshire, CT (US); David P. Dworak, Middletown, CT (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 161 days.

(21) Appl. No.: 16/021,995

(22) Filed: Jun. 28, 2018

(65) Prior Publication Data

US 2018/0305594 A1  Oct. 25, 2018

Related U.S. Application Data

(63) Continuation of application No. PCT/US2017/014008, filed on Jan. 19, 2017.

(60) Provisional application No. 62/281,876, filed on Jan. 22, 2016, provisional application No. 62/362,411, filed on Jul. 14, 2016.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 133/10* | (2006.01) | |
| *C08G 18/73* | (2006.01) | |
| *C09J 123/22* | (2006.01) | |
| *C08G 18/77* | (2006.01) | |
| *C08G 18/69* | (2006.01) | |
| *C08G 18/81* | (2006.01) | |
| *C08L 75/04* | (2006.01) | |
| *C09J 175/16* | (2006.01) | |
| *C08K 5/5415* | (2006.01) | |
| *C09J 133/08* | (2006.01) | |
| *C09J 175/14* | (2006.01) | |
| *C08F 2/48* | (2006.01) | |
| *G02F 1/1337* | (2006.01) | |

(52) U.S. Cl.
CPC ............ *C09J 133/10* (2013.01); *C08G 18/69* (2013.01); *C08G 18/73* (2013.01); *C08G 18/778* (2013.01); *C08G 18/8116* (2013.01); *C08K 5/5415* (2013.01); *C08L 75/04* (2013.01); *C09J 123/22* (2013.01); *C09J 133/08* (2013.01); *C09J 175/14* (2013.01); *C09J 175/16* (2013.01); *C08F 2/48* (2013.01); *G02F 1/133711* (2013.01); *G02F 2202/28* (2013.01)

(58) Field of Classification Search
CPC ...... C09J 133/10; C09J 133/08; C09J 133/16; C09J 133/22; C09J 175/14; C09J 175/16; C08K 5/5415; C08L 75/04; G02F 1/133711; G02F 2202/28; C08G 18/8116; C08G 18/73; C08G 18/69; C08F 2/48
USPC .................. 522/7, 6, 1, 71, 189, 184; 520/1
See application file for complete search history.

(56) References Cited

U.S. PATENT DOCUMENTS

| | | | |
|---|---|---|---|
| 2014/0231008 A1 | 8/2014 | Wang | |
| 2014/0335352 A1* | 11/2014 | Li | C09J 175/16 428/355 CN |
| 2015/0166860 A1 | 6/2015 | Yuan et al. | |
| 2015/0166886 A1 | 6/2015 | Endo et al. | |
| 2015/0376476 A1* | 12/2015 | Rahim | C08K 5/3492 522/18 |

FOREIGN PATENT DOCUMENTS

CN  102925062 A  2/2013

\* cited by examiner

*Primary Examiner* — Jessica Whiteley
(74) *Attorney, Agent, or Firm* — Steven C. Bauman

(57) ABSTRACT

The present invention relates to liquid dual curing (moisture) and photocuring adhesives which are optically transparent/clear. More particularly, the present invention relates to liquid optically transparent/clear adhesives having at least one photo- and/or heat-curable polyolefin-based oligomer, with or without a moisture-curable polyolefin-based oligomer; a curative package to trigger and/or accelerate cure of the oligomer(s) under appropriate cure conditions; and at least one polyolefin-based polyurethane that is not reactive under the cure conditions with the photo- and/or heat-curable polyolefin-based oligomer or the moisture-curable polyolefin-based oligomer. The present invention also relates to optical assemblies that include such optically clear adhesives.

26 Claims, No Drawings

DUAL CURING OPTICALLY TRANSPARENT ADHESIVE COMPOSITIONS

BACKGROUND

Field

The present invention relates to liquid dual curing (moisture) and photocuring adhesives which are optically transparent/clear. More particularly, the present invention relates to liquid optically transparent/clear adhesives having at least one photo- and/or heat-curable polyolefin-based oligomer, with or without a moisture-curable polyolefin-based oligomer; a curative package to trigger and/or accelerate cure of the oligomer(s) under appropriate cure conditions; and at least one polyolefin-based polyurethane that is not reactive under the cure conditions with the photo- and/or heat-curable polyolefin-based oligomer or the moisture-curable polyolefin-based oligomer. The present invention also relates to optical assemblies that include such optically clear adhesives.

BRIEF DESCRIPTION OF RELATED TECHNOLOGY

Liquid, optically clear or transparent adhesives ("LOCA" or "LOCAs") have been used for applications where their clarity and transparency are needed, such as the bonding of optical lenses, display panels and touch screens to substrates. Such optical parts are commonly used on electronic devices, such as phones, computer screens and other imaging equipment. Some commercially available LOCAs, however, use a combination of photocuring and heat curing for bonding. Heat curing has disadvantages in many applications, particularly when the parts to be bonded are heat sensitive. Moisture and light curable LOCAs exist; however, these LOCAs have resins based on poly (meth)acrylate backbones, which do not provide appreciable barrier properties against moisture.

US Patent Application Publication No. 2015/0376476 A1 discloses an actinic radiation and moisture dual curable composition which includes about 10 percent by weight to about 90 percent by weight of a polyolefin-based polymer, which polymer contains both moisture and photocuring functional groups, in combination with a polyolefin-based polymer which has only moisture curing functional groups.

It would be desirable to provide the option of including a moisture curing resin based on a polyolefin-based oligomer, where the moisture curing oligomer desirably is devoid of photocurable groups, blended with a photo- and/or heat-curable resin, which itself is based on a polyolefin oligomer.

The present invention provides that option and in so doing provides an optically transparent/clear liquid polyolefin-based adhesive that can cure through shadow areas by the use of moisture curable oligomers in addition to photo-curable and/or heat-curable oligomers upon exposure to radiation in the electromagnetic spectrum and/or heat. Moreover, the so-provided optically transparent/clear liquid polyolefin-based adhesive imparts improved barrier properties to the bond line and hence improved protection for the device on which it is used. For example, improved barrier properties in an adhesive bond/seal in a touch screen application improves the ability to resist moisture penetration through the bond line into the electronics of the device. In addition, polyolefin backbones offer different and in some cases enhanced mechanical properties than poly(meth)acrylate backbones.

SUMMARY

In one aspect of the invention therefore there is included an adhesive composition comprising:

A. a photo- and/or heat-curable polyolefin-based oligomer, with or without a moisture-curable polyolefin-based oligomer;

B. a curative package to trigger and/or accelerate cure of the oligomer(s) under appropriate cure conditions; and C. at least one polyolefin-based polyurethane that is not reactive under the cure conditions with the photo- and/or heat-curable polyolefin-based oligomer or the moisture-curable polyolefin-based oligomer.

The moisture-curable polyolefin-based oligomer may be present and have the structure:

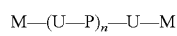

where M represents one or more moisture-curable groups, U represents a component which includes a urethane or urea linkage, and P represents a polyolefin backbone, and n is 1 to 100.

As an example, the moisture-curable resin has the structure:

Structure I

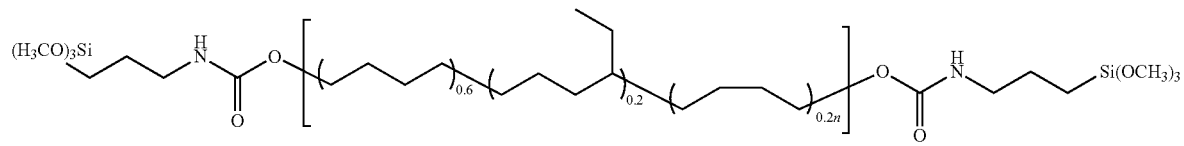

n = 50-60

The heat-curable polyolefin-based oligomer has the structure:

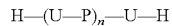

where H represents one or more (meth)acrylate or vinyl groups, U represents a component which includes a urethane or urea linkage, and P represents a polyolefin backbone, and n is 1 to 100.

The photo-curable polyolefin-based oligomer has the structure:

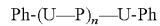

where Ph represents one or more photo-curable groups, such as (meth)acrylate, U represents a component which includes a urethane or urea linkage, and P represents a polyolefin backbone, and n is 1 to 100.

Commercially available examples of such photo-curable polyolefin-based oligomers include CN9014 and CN9070, from Sartomer, Exton, Pa.

The polyolefin-based oligomer(s) that is/are the basis of any or all of the three types of oligomers (e.g., moisture-, photo- or heat-curable) described herein has/have a backbone selected from polybutadiene, butyl rubber, Polyisobutylene, and hydroxylated versions thereof and combinations thereof.

The heat-curable polyolefin-based oligomer may be present in amounts from about 5 percent by weight to about 85 percent by weight of the total composition, desirably about 5 percent by weight to about 30 percent by weight and more desirably about 7 percent by weight to about 15 percent by weight.

The photo-curable polyolefin-based oligomer may be present in amounts from about 5 percent by weight to about 85 percent by weight of the total composition, desirably about 5 percent by weight to about 30 percent by weight and more desirably about 7 percent by weight to about 15 percent by weight.

The moisture-curable polyolefin-based oligomer when used may be present in ranges from about 5 percent by weight to about 85 percent by weight of the total composition, desirably about 15 percent by weight to about 70 percent by weight and more desirably about 30 percent by weight to about 60 percent by weight.

When the curable (based on any of the three cure modalities contemplated herein) polyolefin-based oligomer is based on a polybutadiene oligomer, the average molecular weight of the oligomer (determined by GPC) is about 2,000 to about 3,000. The average residues of the oligomer are about 0.02% polymer <1,000 Mw and about zero % polymer under <500 Mw. Polydispersity index (Mw/Mn) of this oligomer is about 1-1.3.

When the curable polyolefin-based oligomer is based on a butyl rubber oligomer, the average molecular weight of the oligomer (determined by GPC) is about 10,000 to about 15,000. The average residues of the oligomer are about 1.8% polymer <1,000 Mw and 0.9% polymer <5000 Mw. The polydispersity index (Mw/Mn) of this oligomer is about 1.9-2.14.

When the curable polyolefin-based oligomer is based on a polyisobutylene oligomer, the average molecular weight of the oligomer (determined by GPC) is about 10,000 to about 15,000. The average residues of the oligomer are desirably zero % for polymer <1,000 Mw and zero % for polymer <500 Mw, with a polydispersity index (Mw/Mn) of about 1-1.22.

The polyolefin-based polyurethane that is not reactive under the cure conditions with the photo- and/or heat-curable polyolefin-based oligomer or the moisture-curable polyolefin-based oligomer may be represented by:

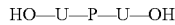
HO—U—P—U—OH where U represents a component which includes a urethane or urea linkage, and P represents a polyolefin backbone.

The curative package comprises one or more curatives and/or one or more catalysts appropriate to trigger and/or accelerate cure of the oligomer(s). For instance, the curative package may comprise a photo-initiator, a thermal initiator, a moisture cure catalyst, and combinations thereof.

In another aspect of the invention there is provided a process for making an optical assembly which includes the steps of: providing a display panel and a top substrate such as a cover lens or a touch panel; disposing the dual curing, optically transparent adhesive composition of the present invention on the display panel; and curing the dual curing, optically transparent adhesive composition by exposing it to elevated temperature and/or electromagnetic radiation, with or without exposure to moisture.

In yet another aspect of the invention there is included a process for reworking an optical assembly, which includes the steps of: detaching a top substrate from a display panel by heating the optical assembly; allowing the detached substrate and display panel to cool to room temperature (25° C.); and peeling the adhesive from the top substrate and/or display panel. This process may further include: disposing the dual curing, optically transparent adhesive composition of the present invention on the display panel; and curing the dual curing, optically transparent adhesive composition by exposing it to elevated temperature conditions and/or electromagnetic radiation, with or without exposure to moisture.

In another aspect of the invention, there is provided an optical assembly which includes a display panel, a top substrate for the display panel, and a bond made from the dual curing optically transparent adhesive composition of the present invention that adheres the display panel to the top substrate.

DETAILED DESCRIPTION

The term "liquid" as it applies to LOCAs means that the adhesive is either liquid at room temperature (25° C.) or can be melted to a liquid and applied at ambient conditions in the melted state to a workpiece or device. Desirably the compositions of the invention are liquid at room temperature.

The phrase "optically clear" includes low yellowness and low haze readings. For example, the colorimetry readings on a Datacolor 650 machine for the compositions of the present invention (as measured against a clear slide) would be about 0-2% for haze and desirably about 0 to less than 1% for haze; and a 0-2 value for "yellowness b", and desirably under a value of 1 for yellowness b and more desirably under a value of 0.5.

LOCAs are widely used in the manufacture and assembly of touch panels and display devices to bond the cover lens, plastic or other optical materials to the main sensor unit or to each other. LOCAs tend to improve the optical characteristics of the device as well as improve other attributes such as durability. The inventive LOCAs are generally used for example to bond the touch panel to the main liquid crystal display, and also to bond any protective cover, such as the lens, to the touch panel. Commercial applications of LOCAs include the assembly and manufacture of capacitive touch panels and 3D televisions.

The LOCA will be considered to be optically clear if it exhibits an optical transmission of at least about 85%. The measurement of optical transmission is known to persons skilled in the art, and may be measured on a 300 μm thick sample according to the following testing method for measuring transmission:

placing a small drop of LOCA on a 75 mm by 50 mm plain micro slide (a glass slide from Dow Corning, Midland, Mich.), that has been wiped with isopropanol and has two 100 μm thick spacer tapes attached at its two ends.

attaching a second glass slide over the LOCA under a force.

curing the LOCA under a UV source.

measuring the optical transmission from wavelength 380 nm to 780 nm with a spectrometer Cary 300 from Agilent, using one blank glass slide as the background.

The term "oligomer" as used herein refers to relatively low molecular weight polymeric compounds which include at least two monomer units linked to each other. Desirably the oligomer includes from 2 to 1000 monomer units linked to each other, and more desirably 2 to 300 monomer units linked to each other.

The term "(meth)acryl" as used herein indicates acryl, methacryl or any combination thereof. Similarly, the term "(meth)acryloxy" indicates acryloxy, methacryloxy or any combination thereof; the term "(meth)acrylic acid" indicates acrylic acid, methacrylic acid or any combination thereof; the term "(meth)acrylate" indicates acrylate, methacrylate or any combination thereof; and the term "(meth)acrylamide" indicates acrylamide, methacrylamide or any combination thereof. The number of the (meth)acryl groups in the (meth) acrylate usable in the present invention is not particularly limited and can be one or more.

The inventive adhesive compositions have a long shelf life and shows good processability, such as during lamination to form the optical assemblies. The adhesive compositions show no yellowing after undergoing various reliability conditions. Moreover, the adhesive compositions show excellent optical performance even under harsh reliability conditions.

The inventive adhesive compositions are suitable for application on uneven surfaces, can be used on large and small panels, are ideal for filling in gaps, avoid condensation and fogging, provide resistance to extreme temperatures, and allow for very thin display designs.

Another challenge with optical assemblies is creating an environment in which the adhesive composition may be reworked so that the LCD module or other expensive parts may be removed and reused, if a defect is discovered after the parts are assembled. For example, end-customers might return a defective display seeking a warranty repair. In such cases, the display manufacturers will want to take apart the display, remove the adhesive residue, and attempt to reuse the expensive functioning components, such as LCD modules. With conventional photo-curable LOCAs, after the display is disassembled, the adhesive residues will be broken into tacky small pieces which stick on the components. Cleaning off the residue using organic solvent is not only very time-consuming, but also has serious environmental concerns and also affects occupational health and safety.

Therefore one aspect of the invention is to make reworking the optical assemblies easier and more practical. The present invention also addresses this problem.

The adhesive compositions of the present invention may form films which provide both the needed bonding and adhesive/sealant capabilities, as well as excellent barrier properties. In addition, the mechanical properties for the specific intended applications are enhanced and may be tailored to take advantage of the polyolefin properties, especially the toughness and barrier properties.

In the preparation of the compositions of the present invention, the moisture curable polyolefin-based oligomer, when used, is prepared by reacting hydroxyl-terminated polyolefins (i.e., hydroxyl terminated polybutadiene, hydroxyl terminated butyl rubber, hydroxyl terminated polyisobutylene) with an alkoxysilane-containing isocyanate, for example, a trimethoxysilane-containing isocyanate (i.e., 3-isocyanatopropyl trimethoxysilane) to prepare a moisture curable polyolefin-based resin. The degree of moisture curable functionality may be of course varied by the number of hydroxyl groups present.

For example, a schematic for preparing a moisture curable polyolefin-based oligomer may be represented as follows:

Moisture Curable HLBH-P 3000 (Polybutadiene):
Example #1

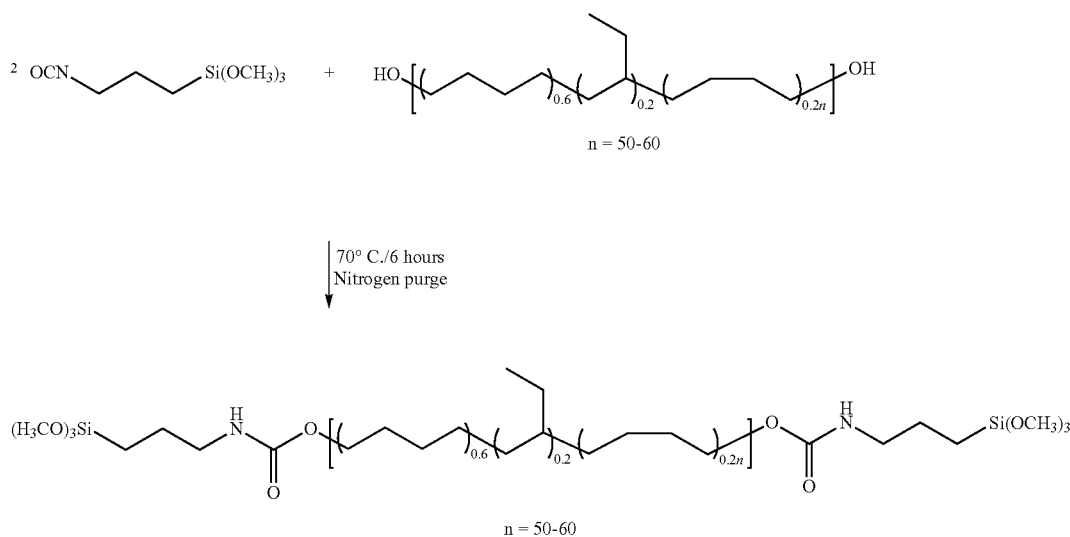

A photo-curable polyolefin-based oligomer may be prepared by reacting a hydroxylated polyolefin with an acrylated isocyanate to form an oligomer containing (meth)acrylate. The degree of (meth)acrylation may also be tailored as desired.

An example of a photo-curable butyl rubber-based resin may have the structure:

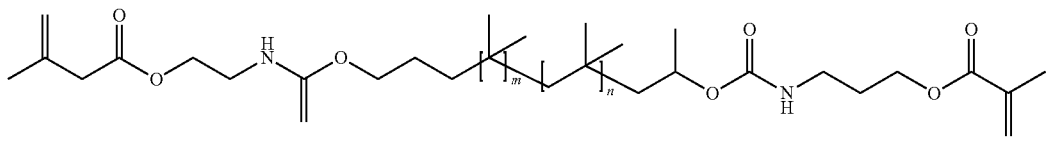

n and m = 100-150

Useful hydroxylated polyolefins include hydroxylated polybutadienes, hydroxylated butyl rubber, hydroxylated polyisoprenes and combinations thereof. These hydroxylated polyolefins may be reacted with isocyanate-functionalized components containing moisture curing groups, such as alkoxy groups (e.g., alkoxysilane groups), to make the oligomer moisture curable, or with isocyanate-containing acrylates to make the oligomer photo-curable instead.

In the present invention, oligomers are selected and used that desirably do not contain both moisture and heat and/or photo-curable groups on the same molecule. Thus, it is desirable to include separate oligomers for each of the cure mechanisms. While more complex and perhaps cumbersome from a formulations standpoint, this approach has proven to be advantageous for allowing better control of cure by attenuating the amount of each type of curable oligomer present in the blend. For example, adding moisture-curable oligomers may impart improved barrier properties to the cured adhesive compositions, which may be called for in some commercial applications. Such cure mechanism control would tend to be more difficult if a single resin component contained both types of moisture curing groups.

On the other hand, the use of resins which cure only by one mechanism, as compared to having multiple types of curing groups on a single molecule, also allows for use of oligomers that are commercially available and thus perhaps less expensive than the manufacture of proprietary ones. Thus, blends of polyolefin-based oligomers is the focus of the present invention to achieve the desirable physical property profiles, particularly blends of polybutadiene-based oligomers; blends of butyl rubber-based oligomers and blends of polyisoprene-based oligomers.

Non-functional polymers are used to adjust adhesive performances such as hardness and modulus. In the LOCA application, the adhesive needs to be soft and of low modulus. The advantage of using polyurethane resins contrasted to low molecular weight polyolefin oligomers is that they have been shown to increase elastic performance with higher elongation and prevent crack formation at higher temperatures.

Diisocyantes are useful to form the urethane linkage in the oligomer or the extended oligomer, as shown in the Examples. The diisocyanates may be chosen from isophorone diisocyanate ("IPDI"), IPDI isocyanarate, polymeric IPDI, naphthalene 1,5-diisocyanate ("NDI"), methylene bis-cyclohexylisocyanate, methylene diphenyl diisocyanate ("MDI"), polymeric MDI, toluene diisocyanate ("TDI"), isocyanurate of TDI, TDI-trimethylolpropane adduct, polymeric TDI, hexamethylene diisocyanate ("HDI"), HDI isocyanurate, HDI biurate, polymeric HDI, xylylene diisocyanate, hydrogenated xylylene diisocyanate, tetramethyl xylylene diisocyanate, p-phenylene diisocyanate, 3,3'-dimethyldiphenyl-4,4'-diisocyanate ("DDDI"), 2,2,4-trimethylhexamethylene diisocyanate ("TMDI"), norbornane diisocyanate ("NDI"), and 4,4'-dibenzyl diisocyanate ("DBDI"). Combinations of diisocyantes may also be used. Monoisocyantes may also be used in the present invention.

The diisocyanate compound may be reacted with a (meth)acrylate-containing hydroxyl compounds to form a urethane-containing (meth)acrylate, which may then further be reacted with an hydroxylated polyolefin to form a photocurable polyolefin-based oligomer.

Among the (meth)acrylate-containing hydroxyl compounds that may be used as noted include 2-hydroxyethyl methacrylate, 2-hydroxyethyl acrylate, 3-hydroxypropyl methacrylate, 3-hydroxypropyl acrylate, 2-hydroxypropyl acrylate, 4-hydroxybutyl acrylate, 3-hydroxybutyl acrylate, 2-hydroxybutyl acrylate, 3-(acryloyloxy)-2-hydroxypropyl methacrylate, 2-isocyanatoethyl methacrylate, 2-isocyanatoethyl acrylate, and poly(propylene glycol) (meth)acrylate. Combinations of these hydroxylated compounds may be used.

These (meth)acrylate-containing hydroxyl compounds when reacted with diisocyanates may form 2-isocyanatoethyl acrylate, 2-isocyanatoethyl methacrylate, 3-isocyanatopropyl (meth)acrylate, 2-isocyanatopropyl (meth)acrylate, 4-isocyanatobutyl (meth)acrylate, 3-isocyanatobutyl (meth)acrylate, and 2-isocyanatobutyl (meth)acrylate.

In order to make moisture-curable polyolefin-based oligomers, alkoxy-containing isocyanates should be chosen, such as 3-isocyanatopropyltriethoxysilane, 3-isocyanatopropylmethyldiethoxysilane, 3-isocyanatopropyldimethylethoxysilane, 3-isocyanatopropyltrimethoxysilane, 3-isocyanatopropylmethyldimethoxysilane, and 3-isocyanatopropyldimethylmethoxysilane.

The inventive adhesive compositions also include initiators, the nature, type and amount of which depending on the nature, type and amount of the polyolefin-based oligomer(s) chosen.

When used, the thermal initiator may be chosen from peroxy materials, e.g., peroxides, hydroperoxides, and peresters, which under appropriate elevated temperature conditions decompose to form peroxy free radicals. The thermal initiators include lauroyl peroxide, benzoyl peroxide, and tert-amyl peroxypivalate, to name a few. Azonitriles also yield free radicals when exposed to elevated temperature conditions, and thus are suitable for use with the inventive compositions.

Thermal initiators may be used in amounts of about 0.1 percent by weight to about 3.0 percent by weight of the total composition, and desirably in about 0.5 percent by weight to about 2.0 percent by weight of the total composition.

When used, the photoinitiator may be chosen from benzyl ketals, hydroxyl ketones, amine ketones and acylphosphine oxides, such as 2-hydroxy-2-methyl-1-phenyl-1-acetone, diphenyl (2,4,6-triphenylbenzoyl)-phosphine oxide, 2-benzyl-dimethylamino-1-(4-morpholinophenyl)-butan-1-one, benzoin dimethyl ketal dimethoxy acetophenone, a-hydroxy benzyl phenyl ketone, 1-hydroxy-1-methyl ethyl phenyl ketone, oligo-2-hydroxy-2-methyl-1-(4-(1-methylvinyl) phenyl)acetone, benzophenone, methyl o-benzyl benzoate, methyl benzoylformate, 2-diethoxy acetophenone, 2,2-disec-butoxyacetophenone, p-phenyl benzophenone, 2-isopropyl thioxanthenone, 2-methylanthrone, 2-ethylanthrone, 2-chloroanthrone, 1,2-benzanthrone, benzoyl ether, benzoin ether, benzoin methyl ether, benzoin isopropyl ether, α-phenyl benzoin, thioxanthenone, diethyl thioxanthenone, 1,5-acetonaphthone, 1-hydroxycyclohexylphenyl ketone, ethyl p-dimethylaminobenzoate, and combinations thereof.

Desirably, the photoinitiator is the combination of 2-hydroxy-2-methyl-1-phenyl-1-acetone and diphenyl (2,4,6-triphenylbenzoyl)-phosphine oxide.

Photoinitiators may be used in amounts of about 0.1 percent by weight to about 3.0 percent by weight of the total composition, and desirably in about 0.5 percent by weight to about 2.0 percent by weight of the total composition.

Moisture cure catalysts are optional but are desirably incorporated into the inventive compositions in amounts useful to effectuate moisture cure, when a moisture curable polyolefin-based oligomer is part of the inventive compositions.

For example useful amounts of a moisture cure catalysts include about 0.01 percent by weight to about 1.0 percent by weight of the total composition, and desirably in amounts of about 0.05 percent by weight to about 0.5 percent by weight of the total composition.

Organometallic catalysts may be included as moisture cure catalysts. The organometallic catalysts desirably are organic tin catalysts, such as stannous octoate, dibutyltin dilaurate, and dibutyltin diacetate.

A variety of additional additives may be incorporated into the present compositions, including reactive and non-reactive diluents, thickeners, stabilizers, monomers, colorants, pigments, antioxidants, plasticizers, catalysts, accelerators, free-radical scavengers, free-radical initiators, rheology modifiers and combinations thereof.

These additives are used in amounts sufficient for their intended purpose, generally about 0.1 percent by weight up to about 2 percent by weight of the total composition.

Monomer additives useful in the present invention may be selected from (meth)acrylic acid, (meth)acrylates and (meth)acrylamides which desirably are liquid at normal temperature so as not to interfere with the requirement for liquidity of the compositions. As used herein, the term "normal temperature" means about 25° C.

As regards (meth)acrylates, the inventive compositions may include a variety of mono-functional (meth)acrylates and multi-functional (meth)acrylates.

Illustrative examples of useful mono-functional (meth)acrylates, include alkyl (meth)acrylates, alkenyl (meth)acrylates, and heterocyclo (meth)acrylates. The alkyl group desirably may be a substituted or unsubstituted alkyl group having 1 to 20 carbon atoms, desirably 1 to 10 carbon atoms, optionally having at least one substituent selected from an alkyl group having 1 to 10 carbon atoms, an alkoxy group having 1 to 10 carbon atoms, an aryloxy group having 6 to 10 carbon atoms or an epoxy group having 2 to 10 carbon atoms.

The alkenyl group on the (meth)acrylate desirably may be a substituted or unsubstituted alkenyl group having 2 to 20 carbon atoms, desirably 2 to 10 carbon atoms, optionally having at least one substituent selected from an alkyl group having 1 to 10 carbon atoms, an alkoxy group having 1 to 10 carbon atoms, an aryloxy group having 6 to 10 carbon atoms, an epoxy group having 2 to 10 carbon atoms, hydroxyl and the like.

The heterocyclo group on the (meth)acrylate desirably may be a substituted or unsubstituted heterocyclo group having 2 to 20 carbon atoms, desirably 2 to 10 carbon atoms, containing at least one hetero atom selected from N and O, and optionally having at least one substituent selected from an alkyl group having 1 to 10 carbon atoms, an alkoxy group having 1 to 10 carbon atoms, an aryloxy group having 6 to 10 carbon atoms, or an epoxy group having 2 to 10 carbon atoms.

Specific examples of mono-functional (meth)acrylates include, but are not limited to, methyl (meth)acrylate, ethyl (meth)acrylate, butyl (meth)acrylate, tetrahydrofuryl (meth)acrylate, lauryl acrylate, isooctyl acrylate, isodecyl acrylate, 2-ethylhexyl acrylate, isobornyl (meth)acrylate, dicyclopentenyl (meth)acrylate, octadecyl acrylate, 2-hydroxyethyl (meth)acrylate, 2-hydroxypropyl (meth)acrylate, 2-hydroxybutyl (meth)acrylate, 2-(2-ethoxyethoxy)ethyl acrylate, 2-phenoxyethyl acrylate, dicyclopentadienyl (meth)acrylate, dicyclopentenyloxyethyl (meth)acrylate, morpholine (meth)acrylate and caprolactone acrylate.

Specific examples of useful multi-functional (meth)acrylates include, but are not limited to, ethylene glycol dimethacrylate, hexanediol di(meth)acrylate, trimethylolpropane triacrylate and pentaerythritol tetraacrylate.

(Meth)acrylamide additives may also be used in the present invention and may be unsubstituted (meth)acrylamides, N-alkyl substituted (meth)acrylamides or N,N-dialkyl substituted (meth)acrylamides. In the N-alkyl substituted (meth)acrylamides, the alkyl substituent desirably has 1 to 8 carbon atoms, such as N-ethyl acrylamide, N-octyl acrylamide and the like. In the N,N-dialkyl substituted (meth)acrylamides, the alkyl substituent desirably has 1 to 4 carbon atoms, such as N,N-dimethyl acrylamide and N,N-diethyl acrylamide.

Adhesion promoters, such as silanes, are also useful in the inventive compositions.

The adhesive compositions of the invention may be applied to substrates to be bonded by conventional methods known in the art. The adhesive compositions of the invention have excellent bonding to glass, metal and plastic substrates. After applying the adhesive compositions of the invention onto predetermined regions on the substrate, radiation in the electromagnetic spectrum, such as in the UV region, may be applied first, which leads to fast curing of the adhesive composition on light-reachable areas, for example, within 5 to 30 seconds. Alternatively, or in addition, exposure to heat may be used to cure or further cure the inventive adhesive compositions.

In order to cure the adhesive compositions in shadow areas, a moisture curing mechanism may be useful. In this regard, complete moisture cure may take as long as one day to achieve complete curing.

The viscosity of the adhesive compositions of the invention may be adjusted in a wide range according to different applications and process conditions, for example, in the range of 1,000 mPas to 10,000 mPas at 25° C. (Measured with a Brookfield viscometer, spindle No. 52, rotation speed 1 rpm.)

EXAMPLES

Example 1

Preparation of 50% Moisture Curable Functionalized Polybutadiene

To a jacketed reaction vessel equipped with an overhead stirrer, thermocouple, and a nitrogen inlet/outlet was added hydroxyl terminated polybutadiene (201.19 g, 0.065 moles) and heated to 60° C. Once at temperature 3-isocyanatopropyl trimethoxysilane (13.32 g, 0.065 moles) was added and allowed to mix for +4 hours. FT-IR was used to monitor the reaction progress and the disappearance of the NCO band at 2200 cm$^{-1}$ was evidence that the reaction was complete. The clear and colorless resin was dropped to yield a 50% functionalized moisture curable polybutadiene-based component (210.7 g, 98.2% yield). The average molecular weight (Mw) determined by GPC was 5717; the Polydispersity index (Mw/Mn) was 1.13; the average polymer residue readings were: 0.026% polymer <1,000 MW; and 0.000% polymer <500 MW.

Example 2

Preparation of 75% Acrylate Functionalized Butyl Rubber

To a jacketed reaction vessel equipped with an overhead stirrer and thermocouple was added hydroxyl terminated butyl rubber (251.28 g, 0.036 moles) and heated to 75° C. Once at temperature 2-isocyanatoethyl acrylate (7.60 g, 0.064 moles) was added and allowed to mix for +5 hours. FT-IR was used to monitor the reaction progress and the disappearance of the NCO band at 2200 cm$^{-1}$ was evidence that the reaction was complete. The clear and colorless resin was dropped to yield a 75% acrylate functionalized butyl rubber (250.1 g, 96.6% yield). The average molecular weight (Mw) determined by GPC was 12,711; the Polydispersity index (Mw/Mn) was 2.14; the average polymer residue readings were: 1.862% polymer <1,000 MW; and 0.991% polymer <500 MW.

Example 3

Preparation of 100% Methacrylate Functionalized Butyl Rubber

To a jacketed reaction vessel equipped with an overhead stirrer and thermocouple was added hydroxyl terminated butyl rubber (284.20 g, 0.041 moles) and heated to 75° C. Once at temperature 2-isocyanatoethyl methacrylate (12.60 g, 0.082 moles) was added and allowed to mix for +5 hours. FT-IR was used to monitor the reaction progress and the disappearance of the NCO band at 2200 cm$^{-1}$ is evidence that the reaction was complete. The clear and colorless resin was dropped to yield a 100% methacrylate functionalized butyl rubber (288.5 g, 97.2% yield).

Example 4

Preparation of 50% Acrylate Functionalized Polybutadiene

To a jacketed reaction vessel equipped with an overhead stirrer and thermocouple was added hydroxyl terminated polybutadiene (265.3 g, 0.086 moles) and heated to 60° C. Once at that temperature 2-isocyanatoethyl acrylate (11.47 g, 0.081 moles) was added and allowed to mix for +4 hours. FT-IR was used to monitor the reaction progress and the disappearance of the NCO band at 2200 cm$^{-1}$ was evidence that the reaction was complete. The clear and colorless resin was dropped to yield a 50% methacrylate functionalized butyl rubber (271.8.5 g, 98.2% yield).

Example 5

Preparation of Extended Polybutadiene (2:1 OH:NCO)

To a jacketed reaction vessel equipped with an overhead stirrer, thermocouple, and a nitrogen inlet/outlet was added hydroxyl terminated polybutadiene (323.75 g, 0.104 moles) and heated to 60° C. Once at that temperature 1,6-hexane diisocyanate (8.80 g, 0.052 moles) was metered in (1 mL/min) and allowed to mix for +6 hours. FT-IR was used to monitor the reaction progress and the disappearance of the NCO band at 2200 cm$^{-1}$ was evidence that the reaction was complete with quantitative yields. The average molecular weight (Mw) determined by GPC was 14,590; the Polydispersity index (Mw/Mn) was 1.56; the average polymer residue readings were: 0.00% polymer <1,000 Mw; and 0.00% polymer <500 Mw.

Example 6

Preparation of Extended Polybutadiene (1.8:1 OH:NCO)

To a jacketed reaction vessel equipped with an overhead stirrer, thermocouple, and a nitrogen inlet/outlet was added hydroxyl terminated polybutadiene (214.23 g, 0.069 moles) and heated to 60° C. Once at that temperature 1,6-hexane diisocyanate (6.47 g, 0.039 moles) was metered in (1 mL/min) and allowed to mix for +6 hours. FT-IR was used to monitor the reaction progress and the disappearance of the NCO band at 2200 cm-1 was evidence that the reaction was complete with quantitative yields. The average molecular weight (Mw) determined by GPC was 20,850; the Polydispersity index (Mw/Mn) was 1.54; the average polymer residue readings were: 0.00% polymer <1,000 Mw; and 0.00% polymer <500 Mw.

Example 7

Preparation of Extended Polybutadiene (1.6:1 OH:NCO)

To a jacketed reaction vessel equipped with an overhead stirrer, thermocouple, and a nitrogen inlet/outlet was added hydroxyl terminated polybutadiene (213.87 g, 0.069 moles) and heated to 60° C. Once at that temperature 1,6-hexane diisocyanate (7.26 g, 0.043 moles) was metered in (1 mL/min) and allowed to mix for +6 hours. FT-IR was used to monitor the reaction progress and the disappearance of the NCO band at 2200 cm-1 was evidence that the reaction was complete with quantitative yields. The average molecular weight (Mw) determined by GPC was 26,432; the Polydispersity index (Mw/Mn) was 1.63; the average polymer residue readings were: 0.00% polymer <1,000 Mw; and 0.00% polymer <500 Mw.

Example 8

Preparation of Extended Polybutadiene (1.4:1 OH:NCO)

To a jacketed reaction vessel equipped with an overhead stirrer, thermocouple, and a nitrogen inlet/outlet was added hydroxyl terminated polybutadiene (218.34 g, 0.070 moles) and heated to 60° C. Once at temperature 1,6-hexane diisocyanate (8.48 g, 0.050 moles) was metered in (1 mL/min) and allowed to mix for +6 hours. FT-IR was used to monitor the reaction progress and the disappearance of the NCO band at 2200 cm-1 was evidence that the reaction was complete with quantitative yields. The average molecular weight (Mw) determined by GPC was 37,777; the Polydispersity index (Mw/Mn) was 1.78; the average polymer residue readings were: 0.00% polymer <1,000 Mw; and 0.00% polymer <500 Mw.

Example 9

Photo- and Moisture-Curable Optically Clear Adhesive Formulation

Example 9 and three comparative examples (Comparative Examples 1-3) are photo- and moisture-curable LOCA formulations containing a moisture curable oligomer (from synthesis Example 1) and acrylate-functionalized polyolefin oligomer, available commercially from Sartomer under the trade designation CN9070. Example 9 also has a non-functional polyurethane (from synthesis Example 5 above); Comparative Example 1 has no such non-functional polyurethane; and Comparative Examples 2 and 3 contain hydroxyl terminated oligomers used as raw materials in synthesis Examples 1 and 2. The sample formulations are captured below in Table A.

TABLE A

| | Sample Nos./Amt (wt %) | | | |
|---|---|---|---|---|
| Component | Example 9 | Comp. Example 1 | Comp. Example 2 | Comp. Example 3 |
| Non-functional polyurethane (from synthesis Example 5) | 25 | 0 | 0 | 0 |
| Hydroxyl terminated butyl rubber (Raw material in Example 2) | 0 | 0 | 20 | 0 |
| Hydroxyl terminated hydrogenated polybutadiene (raw material in Example 1) | 0 | 0 | 0 | 25 |
| 50% Moisture curable polybutadiene-based oligomer (from synthesis Example 1) | 32 | 57 | 45 | 43 |
| Polyolefin-based urethane-acrylate oligomer (CN9070)[1] | 10 | 15 | 10 | 10 |
| Lauryl acrylate | 26.85 | 21.85 | 18.85 | 15.85 |
| Hydroxypropyl methacrylate | 5 | 5 | 5 | 5 |
| UV absorber | 0.2 | 0.2 | 0.2 | 0.2 |
| Photoinitiator | 0.8 | 0.8 | 0.8 | 0.8 |
| Moisture Catalyst | 0.15 | 0.15 | 0.15 | 0.15 |

Example 10

Performance Evaluation

The evaluation methods for the adhesive compositions of Example 9 are as follows:

Photocuring was conducted using a mercury arc lamp that emits UV radiation of at least about 3000 m$^3$/cm$^2$. Moisture curing was conducted in a humidity chamber at a temperature of about 23° C. and a relative humidity of about 50%. UV and moisture dual curing was employed first by exposure to the mercury arc lamp and then by placement in the humidity chamber for a defined period of time. Moisture curing speed is measured by surface tack free time and Shore 00 hardness was measured according to ASTM D2240.

Between two glass slides with a lamination thickness (or gap) of 12.5 mil (about 318 μm) was disposed the LOCA and curing by exposure to UV light was conducted as described previously. Laminated assemblies were formed as a result and were then exposed to elevated temperature conditions of about 95° C. and QUV (QUV Accelerated Weathering Tester) (0.68 W/m$^2$ @340 nm, 50° C.) for a period of time of about 500 hours. Under these aging conditions, defects at the bond line may develop, and if so observed and recorded. Performance test results summarized below in Table B:

TABLE B

| | | Sample Nos./Amt (wt %) | | | |
|---|---|---|---|---|---|
| Physical Property Evaluation | | Example 9 | Comp. Example 1 | Comp. Example 2 | Comp. Example 3 |
| Moisture curing speed | | <48 hr | <24 hr | <48 hr | <48 hr |
| Shore oo hardness | UV | 12 | 38 | 25 | 22 |
| | Moisture | 12 | 50 | 25 | 25 |
| | UV/moisture | 24 | 65 | 50 | 45 |
| 500 hour resistance test | 95° C. | No defect | Bubble and crack formation | | |
| | QUV | No defect | Bubble and crack formation | | |

The evaluation yielded results, which show that the addition of non-functional polyolefin-based polyurethane can lower hardness and prevent bubble or crack formation under high temperature and QUV aging.

Example 11

Light and/or Moisture Curable Optical Clear Adhesive Optical Properties

Optical properties and reliability tests of Example 9 were evaluated and the results are captured below in Table C. Samples for optical property measurements were made by preparing a two glass slide assembly with a thickness (or gap) of 12.5 mil (about 318 μm) therebetween. The samples were cured by UV only, moisture only or by UV and moisture dual cure, as described previously. Optical properties—typically transmittance, haze and the b* value (yellowness)—were measured by a Datacolor 650 apparatus available from Datacolor Corporation, in compliance with ASTM D1003. The samples were also subjected to reliability test conditions, which are as follows: the cured samples were put in high temperature and high humidity chamber (about 85° C., 85% relative humidity), high temperature (about 95° C.) and QUV under the conditions described above for three different time intervals (168, 500 and 1000 hours).

TABLE C

| Aging time | | Optical properties | |
|---|---|---|---|
| (hours) | Aging condition | Haze % | Yellowness |
| 0 | No aging | 0.1 | 0.18 |
| 168 | 85° C./85% RH | 0.1 | 0.08 |
| | 95° C. | 0.3 | 0.29 |
| | QUV | 0.1 | 0.3 |
| 500 | 85° C./85% RH | 0.2 | 0.25 |
| | 95° C. | 0.4 | 0.44 |
| | QUV | 0 | 0.38 |
| 1000 | 85° C./85% RH | 0.4 | 0.46 |
| | 95° C. | 0.5 | 0.7 |
| | QUV | 0.3 | 0.2 |

Desirably, both haze and yellowness values are under 1.0 and thus considered sufficiently optically clear for purposes of the present invention.

What is claimed is:

1. An adhesive composition comprising:
   a photo- and/or heat-curable polyolefin-based oligomer;
   a moisture-curable polyolefin-based oligomer;
   a curative package to trigger and/or accelerate cure of the oligomer(s) under appropriate cure conditions; and
   at least one polyolefin-based polyurethane that is not reactive under the cure conditions with the photoand/or heat-curable polyolefin-based oligomer or the moisture-curable polyolefin-based oligomer, represented by the formula:

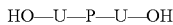

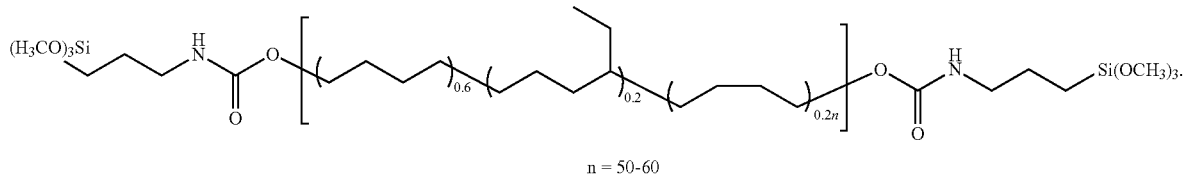

n = 50-60 where U comprises a urethane or urea linkage, and P comprises a polyolefin backbone.

2. The adhesive composition of claim 1, wherein the curative package comprises one or more curatives and/or one or more catalysts appropriate to trigger and/or accelerate cure of the oligomer(s).

3. The adhesive composition of claim 1, wherein the curative package comprises a photoinitiator.

4. The adhesive composition of claim 1, wherein the curative package comprises a thermal initiator.

5. The adhesive composition of claim 1, wherein the curative package comprises a moisture cure catalyst.

6. The composition of claim 5, wherein moisture cure catalyst is present in amounts of about 0.01 percent by weight to about 1.0 percent by weight of the total composition.

7. The composition of claim 3, wherein the photo-initiator is present in amounts of about 0.1 percent by weight to about 3.0 percent by weight of the total composition.

8. The composition of claim 4, wherein the thermal initiator is present in amounts of about 0.1 percent by weight to about 3.0 percent by weight of the total composition.

9. The composition of claim 1, having a haze value of 0-2 and a yellowness value of 0-2, after cure.

10. The composition of claim 1, wherein the photo- and/or heat-curable polyolefin-based oligomer(s) has a backbone selected from the group consisting of polybutadiene, hydrogenated polybutadiene, butyl rubber, polyisobutylene and combinations thereof.

11. The composition of claim 1, wherein the moisture-curable polyolefin-based oligomer contains terminal and/or pendent alkoxy groups.

12. The composition of claim 1, wherein the photo- or heat-curable polyolefin-based oligomer contains terminal and/or pendent (meth)acrylate groups and/or vinyl groups.

13. The composition of claim 1, wherein the moisture-curable polyolefin-based oligomer is present in amounts of about 5 percent by weight to about 80 percent by weight of the total composition.

14. The composition of claim 1, wherein the photo- or heat-curable polyolefin-based oligomer is present in amounts of about 5 percent by weight to about 80 percent by weight of the total composition.

15. The composition of claim 1, wherein the moisture-curable polyolefin-based oligomer has the structure:

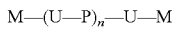

wherein M represents one or more moisture-curable groups, U represents a component which includes a urethane or urea linkage, and P represents a polyolefin backbone, and n is 1 to 100.

16. The composition of claim 1, wherein the moisture-curable polyolefin-based oligomer has the structure:

17. The composition of claim 1, wherein the heat-curable polyolefin-based oligomer has the structure:

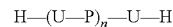

wherein H represents one or more (meth)acrylate or vinyl groups, U represents a component which includes a urethane or urea linkage, and P represents a polyolefin backbone, and n is 1 to 100.

18. The composition of claim 1, wherein the photo-curable polyolefin-based oligomer has the structure:

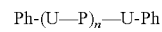

wherein Ph represents one or more photo-curable groups, U represents a component which includes a urethane or urea linkage, and P represents a polyolefin backbone, and n is 1 to 100.

19. The composition of claim 1, wherein the moisture-curable polyolefin-based oligomer is a polyurethane reaction product of a polyolefin diol and an isocyanato alkoxysilane.

20. The composition of claim 1, wherein the moisture-curable polyolefin-based oligomer is a polyurethane reaction product of a polybutadiene diol and isocyanato trimethoxysilane.

21. The composition of claim 1, wherein each of the polyolefin-based oligomers is based on butyl rubber or polyisobutylene and has an average molecular weight (Mw) of about 10,000 to about 15,000.

22. The composition of claim 1, further comprising a (meth)acrylate monomer.

23. The composition of claim 1, further comprising a component selected from the group consisting of diluents, thickeners, stabilizers, colorants, pigments, antioxidants, plasticizers, rheology modifiers and combinations thereof.

24. A process for making an optical assembly comprising the steps of:
  a) providing a display panel and a top substrate comprising a cover lens or a touch panel;
  b) providing the adhesive composition according to claim 1 so that it is disposed between the top substrate and the display panel; and
  c) curing the adhesive composition by exposure to at least one of radiation in the electromagnetic spectrum, heat and moisture.

25. A process for reworking the optical assembly of claim 24, comprising the steps of:
  e) detaching a top substrate from a display panel by heating the optical assembly;
  f) allowing the detached substrate and display panel to cool to room temperature (25° C.); and
  f) peeling the adhesive from the top substrate and/or display panel.

26. An optical assembly comprising a display panel, a top substrate for the display panel and a reaction product of the adhesive composition of claim 1 disposed therebetween.

* * * * *